United States Patent
Widulle et al.

(10) Patent No.: US 9,835,866 B2
(45) Date of Patent: Dec. 5, 2017

(54) SPECTACLE LENS FOR A DISPLAY DEVICE THAT CAN BE FITTED ON THE HEAD OF A USER AND GENERATES AN IMAGE

(71) Applicant: Carl Zeiss Smart Optics GmbH, Aalen (DE)

(72) Inventors: Frank Widulle, Neu-Ulm (DE); Eduard Schmidt, Oberkochen (DE)

(73) Assignee: Carl Zeiss Smart Optics GmbH, Turnstrasse (DE)

( * ) Notice: Subject to any disclaimer, the term of this patent is extended or adjusted under 35 U.S.C. 154(b) by 0 days.

(21) Appl. No.: 15/024,804

(22) PCT Filed: Sep. 25, 2014

(86) PCT No.: PCT/EP2014/070560
§ 371 (c)(1),
(2) Date: Mar. 24, 2016

(87) PCT Pub. No.: WO2015/044305
PCT Pub. Date: Apr. 2, 2015

(65) Prior Publication Data
US 2016/0282621 A1      Sep. 29, 2016

(30) Foreign Application Priority Data
Sep. 27, 2013   (DE) .......... 10 2013 219 622
Apr. 17, 2014   (DE) .......... 10 2014 207 494

(51) Int. Cl.
*G02B 27/14* (2006.01)
*G02B 27/01* (2006.01)
(Continued)

(52) U.S. Cl.
CPC .......... *G02B 27/0172* (2013.01); *G02B 5/09* (2013.01); *G02B 5/10* (2013.01); *G02B 6/00* (2013.01);
(Continued)

(58) Field of Classification Search
CPC .......... G02B 27/0172; G02B 2027/011; G02B 2027/0178
(Continued)

(56) References Cited

U.S. PATENT DOCUMENTS 4,220,400 A    9/1980 Vizenor
6,671,100 B1   12/2003 McRuer
(Continued)

FOREIGN PATENT DOCUMENTS

EP    0704655 A1    4/1996

OTHER PUBLICATIONS

International Preliminary Report on Patentability rendered by the International Bureau of WIPO for PCT/EP2014/070560, dated Mar. 29, 2016, 10 pages.

*Primary Examiner* — James Greece
(74) *Attorney, Agent, or Firm* — Skaar Ulbrich Macari, P.A.

(57) ABSTRACT

A spectacle lens for a display device may include a front side, a rear side, a coupling-in section and a coupling-out section. The coupling-out section includes at least two reflective deflecting surfaces arranged next to each other. The spectacle lens guides light bundles of pixels of the generated image to the coupling-out section in the spectacle lens and couples them out of the spectacle lens through the rear side. The spectacle lens includes a main part with the front and rear side, in which a recess extending from the rear side or from the front side to the surface structure is present, into which an insert element is inserted, the first end of which facing the surface structure is formed complementary to the surface structure, wherein the reflective deflecting surfaces lie between the surface structure of the main part and the first end of the insert element.

15 Claims, 3 Drawing Sheets

(51) Int. Cl.
 *G02B 5/09* (2006.01)
 *G02B 5/10* (2006.01)
 *G02B 6/00* (2006.01)
(52) U.S. Cl.
 CPC .. *G02B 2027/011* (2013.01); *G02B 2027/013* (2013.01); *G02B 2027/0178* (2013.01)
(58) Field of Classification Search
 USPC .......................................... 359/629, 630, 633
 See application file for complete search history.

(56) References Cited

U.S. PATENT DOCUMENTS

| | | |
|---|---|---|
| 6,825,987 B2 | 11/2004 | Repetto et al. |
| 8,384,999 B1 | 2/2013 | Crosby et al. |
| 8,970,961 B2 | 3/2015 | Dobschal et al. |
| 2007/0008624 A1 | 1/2007 | Hirayama |
| 2008/0273246 A1* | 11/2008 | Moliton et al. ............... 359/633 |
| 2013/0229717 A1 | 9/2013 | Amitai |

* cited by examiner

SPECTACLE LENS FOR A DISPLAY DEVICE THAT CAN BE FITTED ON THE HEAD OF A USER AND GENERATES AN IMAGE

PRIORITY

This application claims the benefit of German Patent Application No. 102013219622.9, filed on Sep. 27, 2013, and German Patent Application No. 102014207494.0, filed on Apr. 17, 2014, both of which are hereby incorporated herein by reference in their entirety.

FIELD

The present invention relates to a spectacle lens for a display device that can be fitted on the head of a user and generates an image.

BACKGROUND

With spectacle lenses, it is desirable for the reflective deflecting surfaces to be arranged in the spectacle lens. However, this leads to a complex and cost-intensive production.

SUMMARY

An object of the invention is to provide a spectacle lens such that it can be produced cost-effectively and with precision.

The disclosure includes a spectacle lens, comprising a front side and a rear side, as well as a coupling-in section and a coupling-out section, wherein the coupling-out section comprises at least two reflective deflecting surfaces arranged next to each other and the spectacle lens is suitable for guiding light bundles of pixels of the generated image, which are coupled into the spectacle lens via the coupling-in section, to the coupling-out section in the spectacle lens and, after reflection on the reflective deflecting surfaces, coupling them out of the spectacle lens through the rear side The disclosure includes forming the reflective deflecting surfaces on a surface structure in the spectacle lens and the spectacle lens comprising a main part with the front and rear side, in which a recess extending from the rear side or from the front side to the surface structure is present, into which an insert element is inserted, the first end of which facing the surface structure is complementary to the surface structure, wherein the reflective deflecting surfaces lie between the surface structure of the main part and the first end of the insert element.

This formation of the spectacle lens makes it possible for the main part and the insert element to be produced separately. For example, an injection-molding process can be used for this. The reflective deflecting surfaces can then be formed on the surface structure of the main part or on the first end of the insert element, and the insert element can then be inserted into the recess of the main part in order to produce the spectacle lens. In particular, the recess can extend from the rear side to the surface structure.

The spectacle lens may comprise a light guiding channel in which the light bundles are guided from the coupling-in section to the coupling-out section. When the recess extends from the rear side to the surface structure, the light guiding channel runs through a boundary surface between the main part and the insert element, with the result that the light bundles run through the boundary surface during guiding from the coupling-in section to the coupling-out section. The boundary surface can be positioned such that it encloses an angle which lies in the range of from 70° to 110°, preferably in a range of from 80° to 100°, and in particular in a range of from 85° to 95°, with the main beam of at least one of the light bundles.

The advantage is thus achieved that the boundary surface is not disruptive for the optical imaging quality or causes only minor aberrations which are acceptable.

In particular, the insert element can be formed complementary to the recess of the main part. In this case, no air gap can be present between the insert element and the main part. In particular, the insert element can be adhesively bonded to the main part. Preferably, only the surfaces which are not passed through by the light bundle during the imaging of the virtual image can be adhesively bonded. Naturally, the boundary surfaces which are passed through by the light bundle can alternatively also be adhesively bonded.

A binding agent which has a refractive index adapted to the main part and/or the insert element is preferably used as adhesive.

The second end of the insert element facing away from the surface structure can adjoin flush with the surrounding section of the rear side or of the front side. Thus, a spectacle lens which has a smooth rear side or front side is provided for the user.

The reflective deflecting surfaces are preferably arranged in the spectacle lens such that they are buried in the spectacle lens. Thus, they preferably do not extend to the front side or the rear side.

The insert element and the main part can be formed from the same material. This is particularly advantageous because thermal expansions are then the same, and in terms of optics the same refractive index is present.

In particular, the reflective deflecting surfaces can also have an imaging property together in addition to a pure beam deflection.

The reflective deflecting surfaces are formed in particular such that they have a constant reflectivity over their surface. Thus, in this case, they do not comprise sections with different reflectivities.

The main part can be formed in one piece or several parts. Likewise, the insert element can be formed in one piece or several parts.

The cross-section of the insert element can decrease in one direction from an end facing away from the first end towards the first end. Thus, the insert element tapers in this direction.

In particular, the insert element can be formed substantially in the form of a truncated pyramid or a truncated cone.

The reflective deflecting surfaces can be partially reflective or fully reflective (mirror surfaces).

The disclosure also includes a display device, comprising a holder that can be fitted on the head of a user, an image-generating module secured to the holder, which generates an image, and an imaging optical system secured to the holder, which comprises a spectacle lens according to the invention and, when the holder is fitted on the head, images the generated image such that the user can perceive it as a virtual image.

In particular, the spectacle lens of the imaging optical system can comprise the developments according to the invention.

The display device according to the invention can comprise further elements known to a person skilled in the art which are necessary for operating the display device.

The disclosure additionally includes a method for producing a spectacle lens, in which the main part and the insert element are produced, a reflective coating for forming the reflective deflecting surfaces is produced on the surface structure of the main part and/or the first end of the insert element, and then the insert element is inserted into the recess of the main part.

In particular, the main part and the insert element can be produced separately. For example, they can be produced by means of an injection-molding process. Naturally, it is possible to use an injection mold with which the two parts are produced separately, yet simultaneously.

The insert element can be adhesively bonded to the main part during insertion. For this purpose, known optical adhesives can e.g. be used. In particular, adhesives which can be hardened thermally or by means of UV radiation can be used.

It is understood that the features mentioned above and those yet to be explained below can be used not only in the stated combinations but also in other combinations or alone, without departing from the scope of the present invention.

Figure 1:
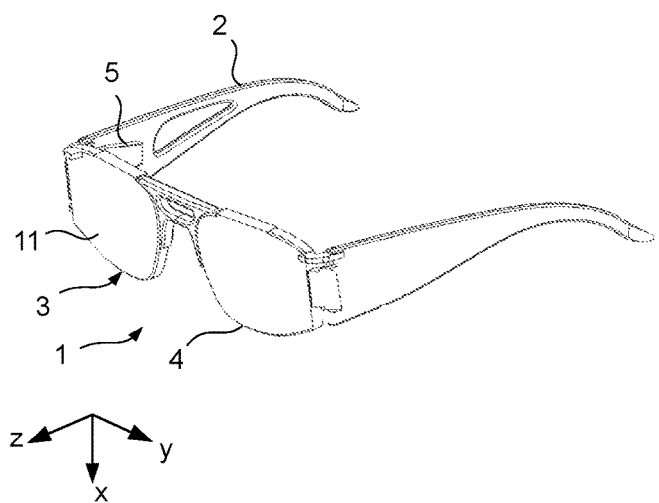
FIG. 1 is a schematic perspective representation of a display device according to certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the display device 1 according to the invention comprises a holder 2 that can be fitted on the head of a user and can be formed e.g. in the manner of a conventional spectacles frame, as well as a first and a second spectacle lens 3, 4, which are secured to the holder 2. The holder 2 with the spectacle lenses 3, 4 can be formed e.g. as sports glasses, sunglasses and/or glasses for correcting defective vision, wherein a virtual image can be reflected into the user's field of view via the first spectacle lens 3, as described below.

For this purpose, the display device 1 comprises an image-generating module 5, which can be arranged in the area of the right-hand temple stem of the holder 2, as is represented schematically in FIG. 1. The image-generating module 5 can comprise a two-dimensional image-generating element 6, such as e.g. an OLED, CMOS or LCoS chip or a tilting mirror matrix with a plurality of pixels arranged e.g. in columns and rows.

The spectacle lenses 3 and 4, and in particular the first spectacle lens 3, are only described together with the display device 1 according to the invention by way of example. The spectacle lenses 3, 4, or at least the first spectacle lens 3, are in each case formed separately as a spectacle lens 3, 4 according to the invention or as an optical element according to the invention. The optical element according to the invention can also be used in another context than with the display device 1 described here. Furthermore, the optical element, when it is formed as a spectacle lens, can, naturally, also be formed as a second spectacle lens 4.

Figure 2:
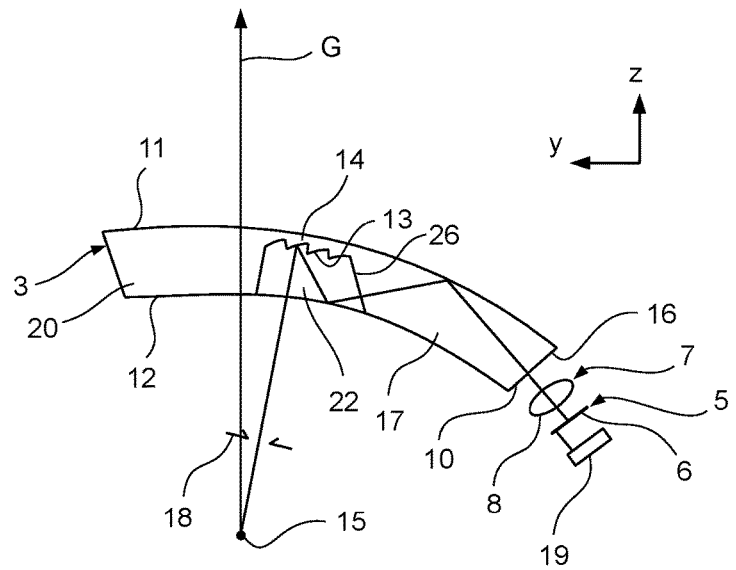
FIG. 2 is an enlarged partial sectional view of the first spectacle lens including a schematic representation of the image-generating module according to certain embodiments of the invention.

As can best be seen from the enlarged partial sectional view from FIG. 2, the display device 1 comprises an imaging optical system 7 which contains an optical element 8 arranged between the image-generating element 6, or the imaging system 6, and the first spectacle lens 3. Furthermore, the first spectacle lens 3 itself also serves as part of the imaging optical system 7.

A light bundle 9 can emerge from each pixel of the imaging system 6. The desired image can be generated by correspondingly controlling the pixels of the imaging system 6 by means of a control unit 19, which can be part of the image-generating module 5. In FIG. 2, the beam path of a light beam is drawn in to represent the light bundle 9, with the result that the light beam 9 is also discussed hereafter.

The light beam 9 emerging from the imaging system 6 runs through the optical element 8 and enters the first spectacle lens via an end face 10 of the first spectacle lens 3. The light beam 9 then strikes a front side 11 of the first spectacle lens 3, wherein the angle of incidence is predetermined such that a total internal reflection occurs. After another total internal reflection on a rear side 12 of the first spectacle lens 3, the light beam 9 strikes one of several reflective deflecting surfaces 13 of a coupling-out section 14 of the first spectacle lens 3, and is reflected to the rear side 12 by the reflective deflecting surface 13 such that the light beam exits the first spectacle lens 3 through the rear side 12.

Thus, when a user is wearing the display device 1 according to the invention on the head as intended, he can perceive the image generated by means of the imaging system 6 as a virtual image when he looks at the coupling-out section 14. In the embodiment described here, the user must look slightly to the right with respect to the direction of view G of a forward view. For the purpose of illustration, the center of rotation 15 of the eye of the user as well as the eyebox 18 or the exit pupil 18 of the imaging optical system 7 are drawn in FIG. 2. The eyebox 18 is the area provided by means of the display device 1 and in which the eye of the user can move while he can still see the generated image as a virtual image.

The section of the first spectacle lens 3 by means of which the light beam 9 is coupled into the spectacle lens 3 can be referred to as coupling-in section 16. Although a coupling-in via the end face 10 is described in the described embodiment, it is also possible to carry out a coupling-in via the rear side 12 of the first spectacle lens 3.

The areas of the front and rear side 11, 12 of the first spectacle lens in which the light beam 9 is guided by means of total internal reflection from the coupling-in section 16 to the coupling-out section 14 form a light guiding channel 17 in which the light bundles 9 are guided from the coupling-in section 16 to the coupling-out section 14.

In the representation in FIG. 2, only one total internal reflection is represented on the front side 11 and on the rear side 12. However, this is to be understood as a purely schematic representation. Naturally, several total internal reflections can occur. Furthermore, it is also possible to provide the front and/or rear side in the area of the light guiding channel 17 with a reflective or partially reflective coating, with the result that the light guiding in the light guiding channel 17 can be brought about by means of conventional reflection on the corresponding reflecting surface. It is furthermore possible to arrange one or two reflective layers in the first spectacle lens 3 which are spaced in each case by the front side 11 and the rear side 12 and serve to guide the light, and thus form the light guiding channel 17 (at least partially).

Figure 3:
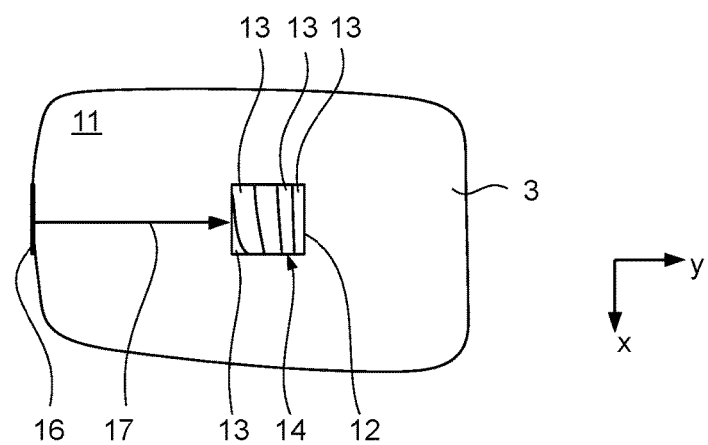
FIG. 3 is a view of the front side of the first spectacle lens according to certain embodiments of the invention.

In the view of the front side 11 shown in FIG. 3, the coupling-in section 16, the light guiding channel 17, as well as the coupling-out section 14 with the reflective deflecting surfaces 13 (or reflective facets 13) are represented schematically.

As is indicated in FIG. 2, the first spectacle lens 3 comprises a main part 20 with a recess 21 into which an insert element 22 is inserted. Through this type of formation of the first spectacle lens 3, this can be produced more easily, which is described below in connection with FIG. 4.

Figure 4:
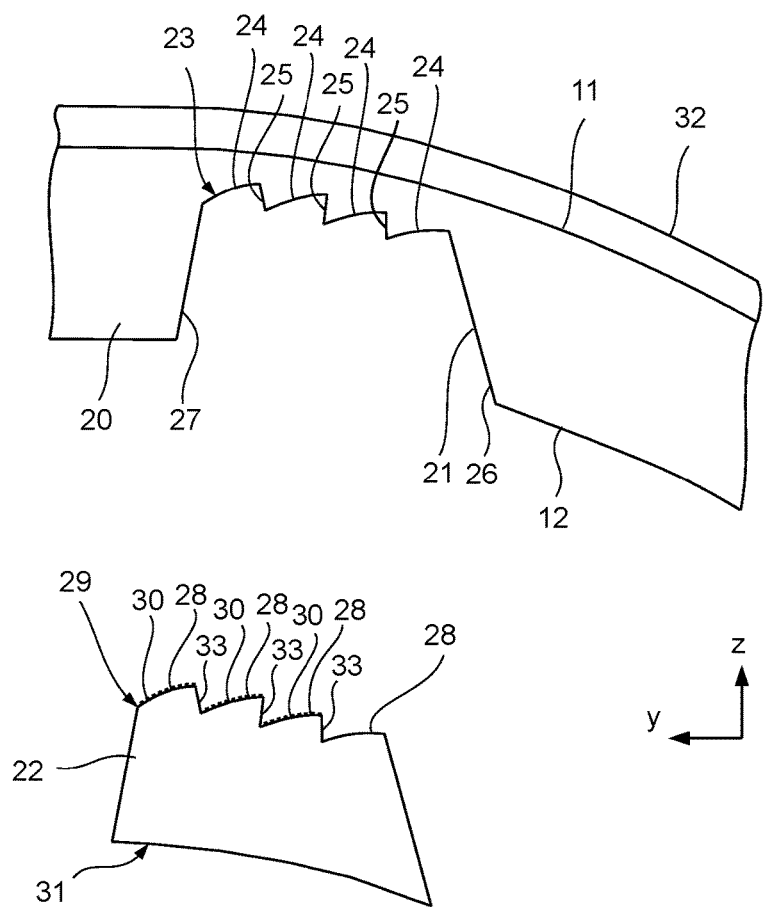
FIG. 4 is an enlarged partial sectional view in exploded representation of the first spectacle lens according to certain embodiments of the invention.

In FIG. 4, the main part 20 and the insert element 22 are shown in an enlarged partial sectional representation before the insert element 22 is introduced into the recess 21 of the main part 20.

As can be learned from this representation, the recess 21 extends from the rear side 12 of the first spectacle lens in the direction of the front side 11, wherein the recess ends in a surface structure 23 which comprises main faces 24 formed curved, which are connected in each case to adjacent faces 25, with the result that a zigzag structure is substantially present in the sectional representation shown in FIG. 4. Here, the main faces 24 are represented curved. However, they can also be formed flat.

The recess 21 is formed substantially in the form of a truncated pyramid and comprises a square cross-section in the yz-plane. Naturally, it can also have any other cross-section shape (e.g. triangle, polygon with more than four angles, round, oval, etc.). Thus, in the embodiment described here, the recess 21 is bound by four lateral boundary surfaces in the main part 20 which extend in each case from the surface structure 23 to the rear side 12. Of these four lateral boundary surfaces, a first lateral boundary surface 26, as well as a second lateral boundary surface 27 can be seen in the sectional representation from FIG. 4. The lateral boundary surfaces are formed such that the recess 21 tapers from the rear side 12 to the surface structure 23.

The insert element 22 has a form which is complementary to the recess 21 (including the surface structure 23), wherein the pieces of surface 28 on the end 29, facing the surface structure 23, of the insert element 22, which are complementary to the main faces 24, are provided with a reflective coating 30 (represented as a dashed line). No reflective coating 30 is provided only on the piece of surface 28 which lies on the far right. The pieces of surface 28 are connected to adjacent faces 33 such that the end 29 has a zigzag structure which is complementary to the surface structure 23.

The insert element 22 is formed substantially in the form of a truncated pyramid and has a square cross-section in the yz-plane. Naturally, the insert element 22 can also have the cross-section shapes described in connection with the recess 21.

The main part 20 and the insert element 22 can e.g. be produced by means of an injection-molding process.

Figure 5:
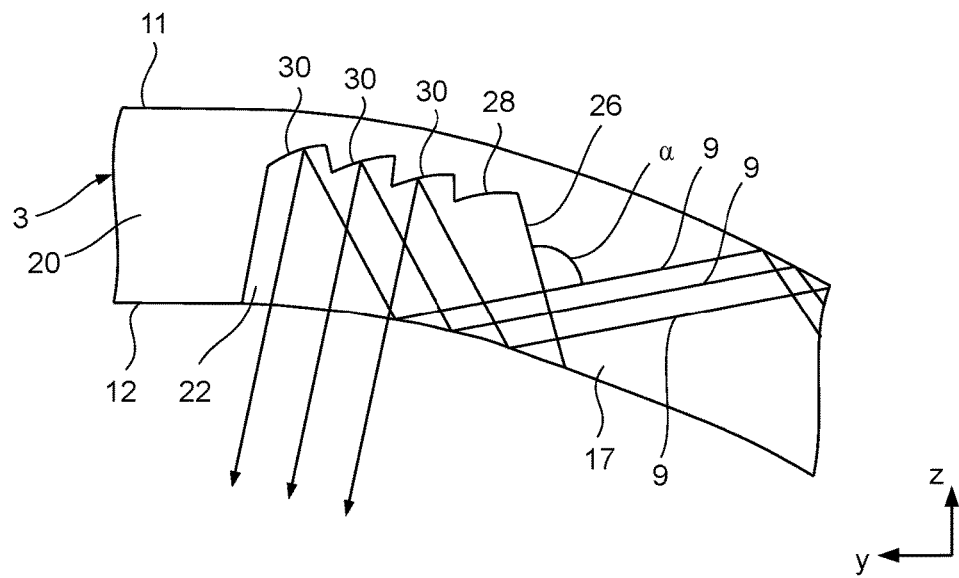
FIG. 5 is an enlarged partial sectional view of the first spectacle lens according to certain embodiments of the invention.

When the insert element 22 is inserted into the recess 21 of the main part 20, as is represented in FIG. 5, the reflective coating 30 of each piece of surface 28 thus lies between the piece of surface 28 and the opposite main face 24 of the main part 20. To simplify the representation, only the reflective coating 30 or the piece of surface 28 is represented in FIG. 5.

Since the piece of surface 28 which lies on the far right does not comprise a reflective coating 30, the piece of surface 28 is provided with the reference number 28.

In the embodiment described here, the insert element 22 is formed such that its second end 31 facing away from the surface structure 23 continues the curvature profile of the rear side 12 seamlessly such that, overall, a continuous rear side 12 is present. In particular, the rear side 12 can have the predetermined curvature or the predetermined curvature profile.

As is further illustrated schematically in FIG. 4, the main part 20 can lie in a mold shell 32, when the insert element 22 is inserted into the recess 21. Thus, it can be ensured that the front side 11 maintains its predetermined curvature profile. However, the provision of the mold shell 32 is only optional and can also be omitted.

In particular, the insert element 22 can be adhesively bonded to the main part 20, with the result that a secure and durable connection is present.

As is represented in FIG. 5, the first boundary surface 26 is oriented relative to the light bundles 9 guided in the light guiding channel 17 such that the light bundles 9 enclose an angle $\alpha$ with the boundary surface 26 which is preferably 90°. In particular, the angle $\alpha$ can lie in a range of from 70° to 110° and particularly preferably 80° to 100°. The light bundle 9 drawn in is the main beam of the light bundle 9 emerging from the respective pixel.

In the case of such an angle, the passage of the light bundles 9 through the boundary surface 26 into the insert element 22 does not lead to any optical disadvantages. In particular, the materials for the main part 20 and the insert element 22 can have different refractive indices, which represents a further degree of freedom in imaging optimization for the representation of the virtual image. Naturally, it is also possible for the refractive indices of the two materials for the insert element 22 and the main part 20 to be equal or almost equal. In particular, the same material can be used for the main part 20 and the insert element 22.

In the embodiment described here, the first spectacle lens 3 is thus formed in two parts and comprises the main part 20, as well as the insert element 22. The main part 20 and the insert element 22 can each be formed in one piece. However, it is also possible for the main part 20 to be formed in several parts. The same is possible for the insert element 22. This too can be formed as an insert element 22 in several parts.

Furthermore, the reflective coating 30 can be formed on the main faces 24 of the main part 20 instead of on the pieces of surface 28. However, it is preferred for the reflective coating 30 to be formed on the pieces of surface 28 of the insert element 22, and for this insert element (with the reflective coatings 30 formed thereon) to then be inserted into the main part 20.

The reflective coatings 30 thus form reflective deflecting surfaces 13 which serve to couple out the light bundles 9 from the first spectacle lens 3. The reflective deflecting surfaces 13 can bring about a pure beam deflection or can in addition also have an imaging property. In particular, they can readjust the imaging property of an imaginary curved optical deflecting surface in a Fresnel manner.

As is illustrated in the representation from FIG. 5, the piece of surface 28 which lies on the far right cannot be formed as reflective deflecting surface and can thus not be used for the imaging. In this case, the corresponding reflective coating 30 can e.g. be omitted in the area of this main face 24. Naturally, it is possible to use the piece of surface which lies on the far right for imaging. In this case, the reflective coating 30 is, naturally, applied to it.

In the case of the described display device 1 according to the invention, the reflection of the virtual image into the user's field of view takes place via the first spectacle lens 3. Naturally, a reflection via the second spectacle lens 4 is also possible. Furthermore, the display device 1 can be formed such that items of information or virtual images are reflected via both spectacle lenses 3, 4. The reflection can take place such that a three-dimensional image impression results. However, this is not absolutely necessary.

The spectacle lenses 3, 4 can have a refractive power of zero or a refractive power different from zero (in particular to correct defective vision). As is shown in the figures, both the front side 11 and the rear side 12 of the spectacle lens 3 are formed curved. Naturally, the front side 11 and/or the rear side 12 can also be flat. In particular, the front side 11 can be spherically curved. If the spectacle lens has a refractive power different from zero, in order to correct defective vision, as a rule the curvature of the rear side 12 is usually selected accordingly, in order to achieve the suitable correction. The rear side 14 can then have a curvature deviating from the spherical form.

The holder 2 does not have to be formed as a spectacle-type holder. Any other type of holder with which the display device can be fitted or worn on the head of the user is also possible.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for a display device that can be fitted on the head of a user and which generates an image, the spectacle lens comprising:
   a main part with the front side and the rear side, in which a recess extending from the rear side or from the front side to a surface structure is defined,
   a coupling-in section;
   a coupling-out section, comprising at least two reflective deflecting surfaces arranged next to each other; and
   an insert element insertable into the recess in the main part, the insert element including a first end facing the surface structure that is shaped complementary to the surface structure,
   wherein the reflective deflecting surfaces lie between the surface structure of the main part and the first end of the insert element,
   wherein the spectacle lens is configured to guide light bundles of pixels of the generated image, which are coupled into the spectacle lens via the coupling-in section, to the coupling-out section in the spectacle lens and, after reflection on the reflective deflecting surfaces, coupling them out of the spectacle lens through the rear side, and
   wherein the reflective deflecting surfaces are formed on the surface structure in the spectacle lens.

2. The spectacle lens according to claim 1,
   wherein the recess extends from the rear side to the surface structure,
   wherein the spectacle lens comprises a light guiding channel, in which the light bundles are guided from the coupling-in section to the coupling-out section and which extends through a boundary surface between the main part and the insert element, with the result that the light bundles run through the boundary surface during guiding from the coupling-in section to the coupling-out section, and
   wherein the boundary surface is positioned such that the boundary surface encloses an angle which lies in the range of 70° to 110° with the main beam of at least one of the light bundles.

3. The spectacle lens according to claim 1, wherein the insert element is formed complementarily to the recess of the main part.

4. The spectacle lens according to claim 1, wherein the second end, which faces away from the surface structure, of the insert element defines a flush surface with the rear side or the front side.

5. The spectacle lens according to claim 1, wherein the insert element is adhesively bonded to the main part.

6. The spectacle lens according to claim 1, wherein the insert element and the main part are formed from the same material.

7. The spectacle lens according to claim 1, wherein the reflective deflecting surfaces together have an imaging property.

8. The spectacle lens according to claim 1, wherein the main part is formed as one piece.

9. The spectacle lens according to claim 1, wherein the insert element is formed as one piece.

10. The spectacle lens according to claim 1, wherein a cross-section of the insert element decreases in a direction from a second end facing away from the first end towards the first end.

11. The spectacle lens according to claim 1, wherein the reflectivity of the reflective deflecting surfaces is constant over the entirety thereof.

12. A display device, comprising:
    a holder configured to be fitted on a head of a user;
    an image-generating module secured to the holder, which generates an image,
    an imaging optical system secured to the holder, which comprises a spectacle lens according to claim 1 and which, when the holder is fitted on the head, images the generated image such that the user can perceive the generated image as a virtual image.

13. A method for producing a spectacle lens according to claim 1, in which the main part and the insert element are produced, the method comprising:

producing a reflective coating on the surface structure of at least one of the main part and the first end of the insert element in order to form the reflective deflecting surfaces; and after the producing step, inserting the insert element into the recess of the main part.

14. A spectacle lens for a display device that can be fitted on the head of a user and which generates an image, the spectacle lens comprising:

a main body defining a front side and a rear side, and including a recess defined into the main body from either the rear side or from the front side and the recess terminating in a multi-faceted surface structure, the main body including a coupling-in section and a coupling-out section, wherein the coupling-out section includes the multi-faceted surface structure, wherein the multi-faceted surface structure includes at least two reflective deflecting surfaces arranged next to each other; and an insert element sized and shaped to be insertable into the recess in the main body, the insert element including a first end facing the multi-faceted surface structure that is shaped complementary to the multi-faceted surface structure, wherein the reflective deflecting surfaces lie between the multi-faceted surface structure of the main body and the first end of the insert element, wherein the spectacle lens is configured to guide light bundles of pixels of the generated image, which are coupled into the spectacle lens via the coupling-in section, to the coupling-out section in the spectacle lens and, after reflection on the reflective deflecting surfaces, coupling them out of the spectacle lens through the rear side, and wherein the reflective deflecting surfaces are formed on the multi-faceted surface structure in the spectacle lens.

15. The spectacle lens according to claim 14, wherein the insert further defines a second end that faces away from the first end, the second end shaped such that it defines a flush surface with the rear side or the front side of the main body.

* * * * *